United States Patent [19]

Rodrigues

[11] Patent Number: 4,852,623
[45] Date of Patent: Aug. 1, 1989

[54] EXTENSION TABLE FOR A TABLE SAW

[76] Inventor: John M. Rodrigues, 12358 Deerbrook La., Los Angeles, Calif. 90049

[21] Appl. No.: 189,548

[22] Filed: May 3, 1988

[51] Int. Cl.$^4$ ............................................. B25H 1/02
[52] U.S. Cl. ................................... 144/287; 83/477.2; 83/471.3; 144/286 R; 269/289 MR; 269/901
[58] Field of Search ...................... 269/289 M R, 901; 83/477 Z, 648, 859, 471.2, 471.3; 144/286 R, 287

[56] References Cited

U.S. PATENT DOCUMENTS

| | | | |
|---|---|---|---|
| 1,658,826 | 2/1928 | Yenk et al. | 144/287 |
| 2,766,788 | 10/1956 | Kahn | 144/286 R |
| 3,931,751 | 1/1976 | Simonson | 83/477 Z |
| 4,753,279 | 6/1989 | Harris | 144/287 |

FOREIGN PATENT DOCUMENTS

| | | | |
|---|---|---|---|
| 18495 | 11/1980 | European Pat. Off. | 269/289 MR |
| 342729 | 6/1921 | Fed. Rep. of Germany | 144/287 |

Primary Examiner—W. Donald Bray
Attorney, Agent, or Firm—W. Edward Johansen

[57] ABSTRACT

An extension table is for use with a table saw which includes a table with discharge end and power saw. The extension table includes a base, a cylinder and a support assembly which supports the base. The base is a rectangular member which has a bottom surface with a rectangular slot on the bottom surface thereof and two arms. The cylinder is rotatingly coupled to the two arms by two screws. The support assembly has a support beam, a slidable support and an adjustable coupler. The support beam has a first elongated slot. The slidable support is an inverted Y-shaped member having a leg which is insertedly coupled into the rectangular slot of the base and two arms which are slidably coupled to the support beam. The adjustable coupler includes a coupling beam which has a second elongated slot, two chains and a board. The coupling beam is mechanically coupled to the table at its discharge end adjacent to the bottom thereof. Each chain is detachably coupled to the table at its discharge end adjacent to the top thereof and is mechanically coupled to the support beam. The board has two ends each of which is disposed in one of the first and second elongated slots of the support beam and the coupling beam, respectively. The extension table is attached to the table saw in order to facilitate support of a comparatively long board throughout its entire length of travel.

3 Claims, 2 Drawing Sheets

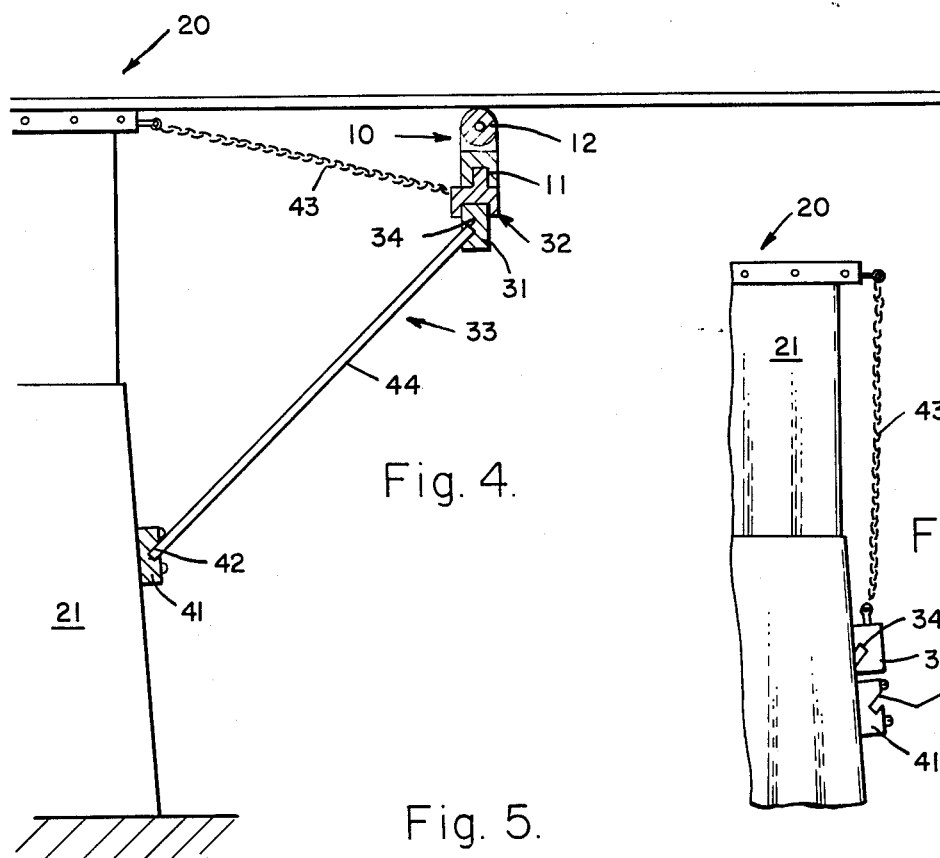
Fig. 4.
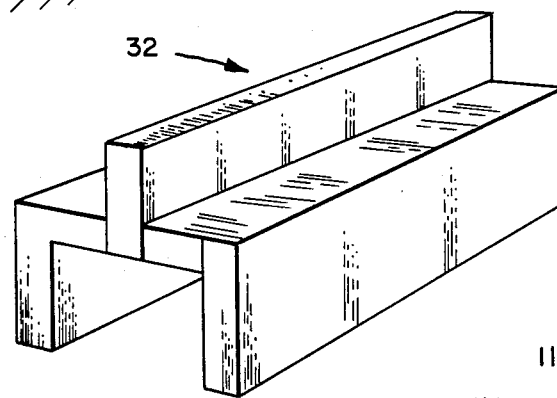
Fig. 5.
Fig. 6.
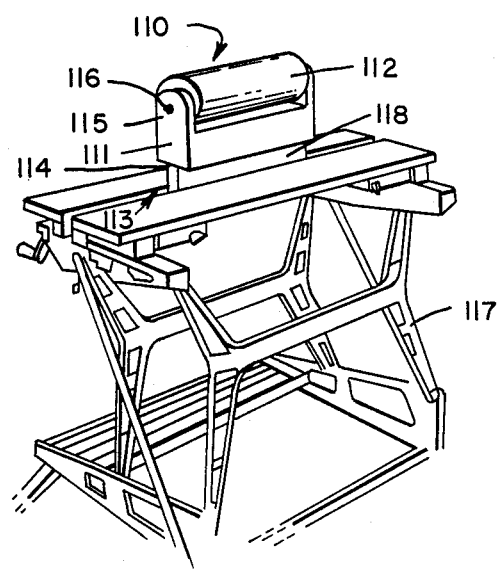
Fig. 7.

EXTENSION TABLE FOR A TABLE SAW

BACKGROUND OF THE INVENTION

1. Field of the Invention

The present invention relates to an extension table for use with a table saw and which is attached to the discharge end thereof in order to facilitate support of comparatively long boards throughout its entire length of travel so that the tendency of the long board to rise into the cutterhead knives is either minimized or eliminated and more particularly to an extension table which is not only convenient to use, but which is easy to store.

2. Description of the Prior Art

U.S. Pat. No. 4,640,326, entitled Stand for a Table Saw, issued to Timothy W. Hewitt on Feb. 3, 1987, teaches a stand for a table saw. The stand includes a rollertable. In *Home Mechanix*, Volume 83, Number 716, page 84, December, 1987 HTC Products, Inc. described a pedestal roller and the rollertable. The pedestal roller includes a pedestal which is adjustable in height and collapsible, a base which is mechanically coupled to the base and a cylinder which is rotatably coupled to the base. The rollertable includes a table and plurality of rollers which are mechanically coupled to the table on its top surface.

U.S. Pat. No. 4,106,381, entitled Extension Table for Table Saws, issued to Lloyd D. Kreitz on Aug. 15, 1978, teaches a folding extension table which is attached to the discharge end of a table saw to facilitate support of comparatively long workpieces. The extension table is designed to permit miter gauge rods to slide forward without interference. Other features include the manner of attachment, which offers versatility in adapting to a wide variety of saw assembly dimensions and configurations.

U.S. Pat. No. 4,406,200, entitled Table Extension for Table Saws, issued to William S. Kerr on Sept. 27, 1983, teaches a table extension for use with a table saw. The table extension projects from one of the ends in the path of movement of the work piece. The table includes a table with a top surface. The table extension has a top surface that is coplanar with the top surface of the table.

U.S. Pat. No. 4,068,551, entitled Extension Table for Power Saws, issued to Lloyd D. Kreitz on Jan. 17, 1978, teaches an extension table for use with power saws, e.g., radial arm saws or table saws, are provided with a folding extension table to accommodate comparatively long workpieces. The distal end of the table is supported by folding legs; its proximal end is pivotally connected to one edge of the normal worktable.

In the Sears' catalogue, entitled *Specialog*, for 1985/86, power and hand tools are advertized. On page 43, an adjustable height work support table is shown and described as item number 25. The adjustable height work support table acts like a third hand to help support long pieces of wood. Similarly, in Belsaw Machinery Company's *Bulletin*, Volume 52, Number 3, page 25, May, 1979, an extension roller is shown and described for use in supporting a long piece for wood. The extension roller includes an height-adjusting stand, a base and a cylinder which is rotatingly coupled to the base.

U.S. Pat. No. 3,931,751, entitled Collapsible Mounting for Power Saw Units, issued to Paul A. Simonson on Jan. 13, 1975, teaches a portable and collapsible mounting for a table saw which includes a pedestal roller and a collapsible table. The pedestal roller includes a pedestal, a base and cylinder. The pedestal is adjustable in height and collapsible. The base is mechanically coupled to the base. The cylinder is rotatably coupled to the base.

U.S. Pat. No. 4,726,405, entitled Extension Table Assembly for Table Saws, issued to Alvin L. Bassett on Feb. 2, 1988, teaches an extension table assembly for a table saw. The extension assembly includes an elongated top slab assembly supported by a wheeled carriage and attachable at one end to the top table of a table saw to be coplanar therewith. A series of fences is carried by the top slab assembly at successively different spacings from that end of the top slab. Each fence is movable from an operative position extending above the slab to an inoperative position not extending thereabove.

U.S. Pat. No. 4,128,028, entitled Support Table for Circular Saw, issued to Danny Gay, James Horine, James C. Hudson, Joseph P. Sallee amd Hershel R. Wininger on Dec. 5, 1978, teaches a table to support and position a circular saw.

U.S. Pat. No. 4,385,539, entitled Articulated Dust Cover Means for Table Saw or other Power-Driven Apparatus, issued to Carl E. Meyerhoefer and Carl H. Meyerhoefer on May 31, 1983, teaches a table saw. U.S. Pat. No. 3,339,599 and U.S. Pat. No. 3,349,819 also teach table saws.

U.S. Pat. No. 4,693,156, entitled Table Saw Accessory, issued to Armando C. Olvera on Sept. 15, 1987, teaches an accessory for a table saw which includes a plate. The plate has rollers thereon which are received in the parallel grooves of a conventional table saw.

U.S. Pat. No. 4,644,833, entitled Workpiece Supporting Table for Panel Saws, issued to Erwin Jenkner on Feb. 24, 1987, teaches a workpiece supporting table for panel saws which ensures that during the splitting-up and formatting of workpieces, chip-type sawing residues penetrating between the table and a workpiece placed on it cannot scratch a sensitive workpiece surface resting on the table when the workpiece is moved into a new cutting position.

SUMMARY OF THE INVENTION

In view of the foregoing factors and conditions which are characteristic of the prior art it is the primary object of the present invention to provide an extension table for use with a table saw which is attached to the discharge end thereof in order to facilitate support of comparatively long boards throughout its entire length of travel so that the tendency of the long board to rise into the cutterhead knives is either minimized or eliminated.

It is another object of the present invention to provide an extension table which is convenient to use and easy to store.

In accordance with an embodiment of the present invention an extension table for use with a table saw is described. The table saw includes a table with discharge end and a power saw. The extension table includes a base, a cylinder and a support assembly which supports the base. The base is a rectangular member which has a bottom surface with a rectangular slot on the bottom surface thereof and two arms. The cylinder is rotatingly coupled to the two arms by two screws. The support assembly has a support beam, a slidable support and an adjustable coupler. The support beam has a first elongated slot. The slidable support is an inverted Y-shaped member having a leg which is insertedly coupled into the rectangular slot of the base and two arms which are slidably coupled to the support beam. The adjustable coupler includes a coupling beam which has a second elongated slot, two chains and a board. The coupling beam is mechanically coupled to the table at its discharge end adjacent to the bottom thereof. Each chain is detachably coupled to the table at its discharge end adjacent to the top thereof and is mechanically coupled to the support beam. The board has two ends each of which is disposed in one of the first and second elongated slots of the support beam and the coupling beam, respectively. The extension table is attached to the table saw in order to facilitate support of a comparatively long board throughout its entire length of travel.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 4 is a side elevational view of the table saw of FIG. 3 and the first extension table of FIG. 1 in a which a board supports the FIG. 5 is a perspective view of a slidable support which is used with the first extension table of FIG. 1.

FIG. 6 is a paretial side elevational view of the table saw and the first extension table of FIG. 3 with the board of FIG. 4 having been removed.

FIG. 7 is a perspective view of a second extension table which is in use with a work bench and a piece of scrap wood and which has been constructed in accordance with the principles of a second embodiment of the present invention.

DESCRIPTION OF THE PREFERRED EMBODIMENT

Figure 1:
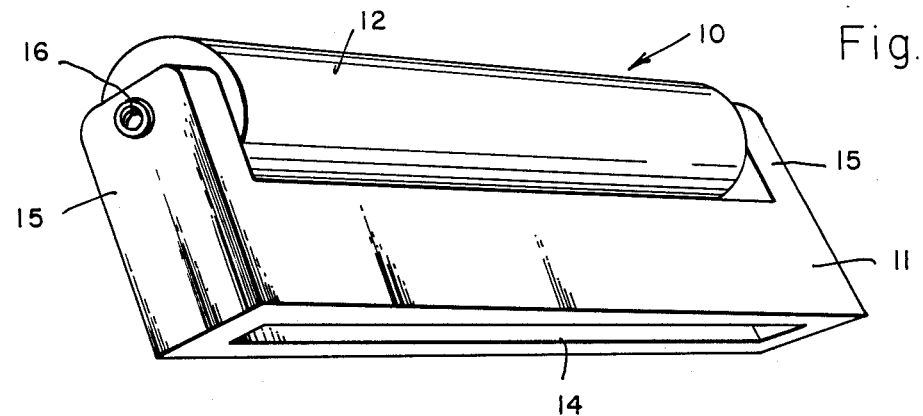
FIG. 1 is a perspective view of a first extension which has been constructed in accordance with the principles of a first embodiment of the present invention.
Figure 2:
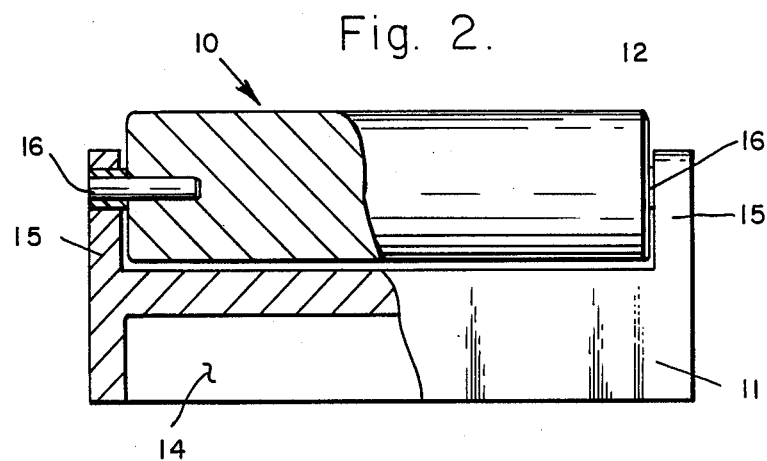
FIG. 2 is a side elevational view in partial cross-section of the first extension table of FIG. 1.

In order to best understand the present invention it is necessary to refer to the following description of its preferred embodiment in conjunction with the accompanying drawing. Referring to FIG. 1 in conjunction with FIG. 2 a first extension table 10 includes a first base 11, a first cylinder 12 and a first support assembly 13 which supports the first base 11. The first base 11 is a rectangular member which has a bottom surface with a rectangular slot 14 on the bottom surface thereof and two arms 15. The first cylinder 12 is rotatingly coupled to the two arms 15 by two screws 16.

Figure 3:
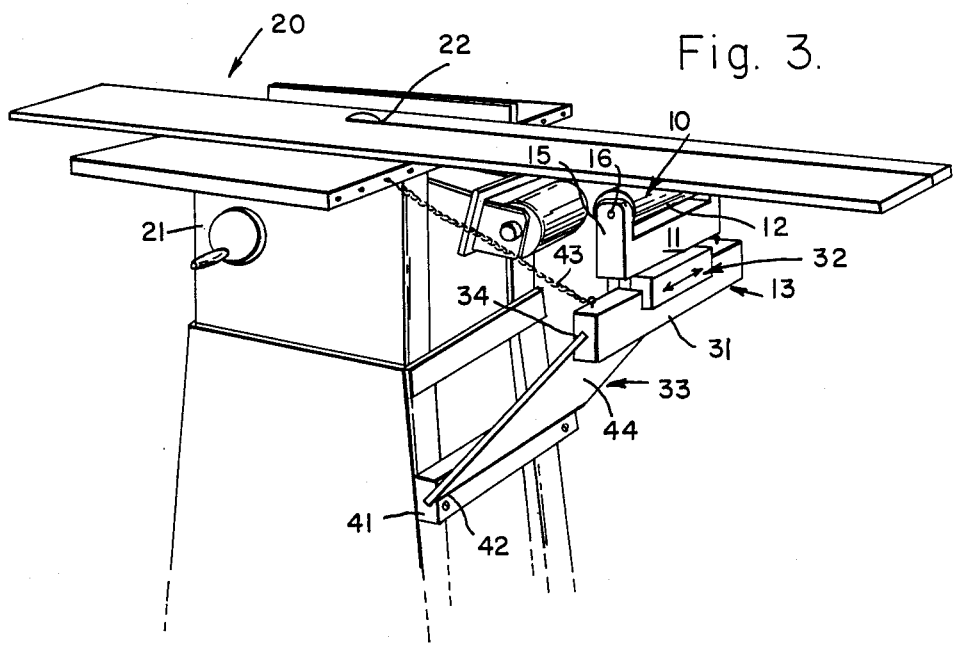
FIG. 3 is a perspective view of the first extension table of FIG. 1 which is in use with a table saw.

Referring to FIG. 1 in conjunction with FIG. 3 the first extension table 10 is used with a table saw 20 which includes a table 21 with discharge end and a power saw 22. The first extension table 10 is attached to the discharge end of the table saw 20 in order to facilitate support of a comparatively long board throughout its entire length of travel.

Referring to FIG. 3 in conjunction with FIG. 4 and FIG. 5 the first support assembly 13 has a support beam 31, a slidable support 32 and an adjustable coupler 33. The support beam 31 has a first elongated slot 34. The slidable support 32 is an inverted Y-shaped member having a leg which is insertedly coupled into the rectangular slot 14 of the base 11 and a pair of arms which are slidably coupled to the support beam 31. The adjustable coupler 33 includes a coupling beam 41 which has a second elongated slot 42, two chains 43 and a board 44. The coupling beam 41 is mechanically coupled to the table 21 at its discharge end adjacent to the bottom thereof. Each chain 43 is detachably and adjustably coupled to the table 21 at its discharge end adjacent to the top thereof and is mechanically coupled to the support beam 31 at one end thereof. The board 44 has two ends each of which is disposed in one of the first and second elongated slots 34 and 42 of the support beam 31 and the coupling beam 41, respectively. The adjustable coupler 33 couples the support beam 31 to the table 21 at its discharge end.

Referring to FIG. 3 in conjunction with FIG. 4 and FIG. 6 the operator may store the first support assembly 13 by removing the board 44 from the first and second elongated slots 34 and 42 of the support beam 31 and the coupling beam 41, respectively, and letting the support beam 31 with the two chains 43 hang adjacent to the discharge end of the table 21.

Referring to FIG. 7 a second extension table 110 includes a second base 111, a second cylinder 112 and a second support assembly 113 which supports the second base 111. The second base 111 is a rectangular member which has a bottom surface with a rectangular slot 114 on the bottom surface thereof and two arms 115. The cylinder 112 is rotatingly coupled to the two arms 115 by two screws 116. The second support assembly 113 may include a work bench 117 and a piece 118 of scrap wood. The work bench 117 is similar to the work bench which Black and Decker sells under its trademark, entitled Workmate.

From the forgoing it an be seen that extension table for use with a table saw has been described. It should be noted that distances of and between the figures are not to be considered significant.

Accordingly it is intended that the foregoing disclosure and showing made in the drawing shall be considered only as an illustration of the principles of the present invention.

What is claimed is:

1. An extension table for use with a table saw which includes a table with discharge end and a power saw, said extension table comprising:
   a. a rectangular member which has a bottom surface with a rectangular slot therein and which has a pair of arms;
   b. a cylinder;
   c. rotatingly coupling means for rotatingly coupling said cylinder to said pair of arms of said rectangular member; and
   d. supporting means for supporting said retangular member whereby said extension table is attached to the discharge end of the table saw in order to facilitate support of a comparatively long board throughout its entire length of travel.

2. An extension table for use with a table saw which includes a table with discharge end and a power saw, said extension table comprising:
   a. a base;
   b. a cylinder;

c. rotatingly coupling means for rotatingly coupling said cylinder to said base;
d. a support beam which supports said base;
e. a slidable support which is an inverted Y-shaped member having a leg which is insertedly coupled into said rectangular slot of said base and a pair of arms which are slidable coupled to said support beam; and
f. adjustable coupling means for adjustable coupled said support beam to the table at its discharge ends whereby said extension table is attached to the discharge end of the table saw in order to facilitate support of a comparatively long board throughout its entire length of travel.

3. An extension table for use with a table saw according to claim 2 wherein said support beam has a first longitudinal slot and said adjustably coupling means comprises:
   a. a coupling beam which has a second longitudinal slot and which is mechanically coupled to the table at its discharge end adjacent to the bottom thereof;
   b. a pair of chains each of which is detachably coupled to the table at its discharge end adjacent to the top thereof and each of which is mechanically coupled to said support beam at one end thereof; and
   c. a board having two ends each of which is disposed in one of said first and second elongated slots of said support beam and said coupling beam, respectively.

\* \* \* \* \*